(12) United States Patent
Vicente et al.

(10) Patent No.: US 8,018,092 B2
(45) Date of Patent: Sep. 13, 2011

(54) SYSTEM AND METHOD FOR MANAGING POWER SUPPLY TO A CIRCUIT BREAKER CONTROL UNIT

(75) Inventors: Nataniel Barbosa Vicente, Prospect, KY (US); Brian Patrick Lenhart, Jr., Louisville, KY (US); Stephen James West, Louisville, KY (US); Todd Greenwood, Pewee Valley, KY (US); Sreenivasulu R. Devarapalli, Louisville, KY (US); Zubair Hameed, Louisville, KY (US)

(73) Assignee: General Electric Company, Schenectady, NY (US)

( * ) Notice: Subject to any disclaimer, the term of this patent is extended or adjusted under 35 U.S.C. 154(b) by 518 days.

(21) Appl. No.: 12/103,312

(22) Filed: Apr. 15, 2008

(65) Prior Publication Data

US 2009/0256426 A1    Oct. 15, 2009

(51) Int. Cl.
*H02J 1/00* (2006.01)
(52) U.S. Cl. ........................................................ 307/66
(58) Field of Classification Search .................... 307/23, 307/29, 66; 361/170, 605; 700/292, 293
See application file for complete search history.

(56) References Cited

U.S. PATENT DOCUMENTS

| 4,870,531 | A | | 9/1989 | Danek |
| 5,488,338 | A | | 1/1996 | Seymour et al. |
| 5,544,959 | A | | 8/1996 | Collin et al. |
| 5,990,577 | A | * | 11/1999 | Kamioka et al. ............. 307/26 |
| 6,018,451 | A | * | 1/2000 | Lyke et al. ................. 361/93.2 |
| 6,297,939 | B1 | | 10/2001 | Bilac et al. |
| 2002/0065618 | A1 | * | 5/2002 | Oh ................................. 702/57 |

FOREIGN PATENT DOCUMENTS

WO    92/09899    6/1992

* cited by examiner

*Primary Examiner* — Jared J Fureman
*Assistant Examiner* — Daniel Cavallari
(74) *Attorney, Agent, or Firm* — Cantor Colburn LLP

(57) ABSTRACT

A system for controlling power in a circuit breaker trip unit is disclosed. The system includes: a user interface operably coupled to the trip unit and having a plurality of input keys; a power conditioner operably coupled to the user interface and operably coupled to a battery power source and an external power source; and a power control circuit. The power control circuit is configured to automatically electrically connect the battery power source to the power conditioner in response to activation of any of the plurality of input keys, and in the absence of an electrical connection between the external power source and the power conditioner.

19 Claims, 8 Drawing Sheets

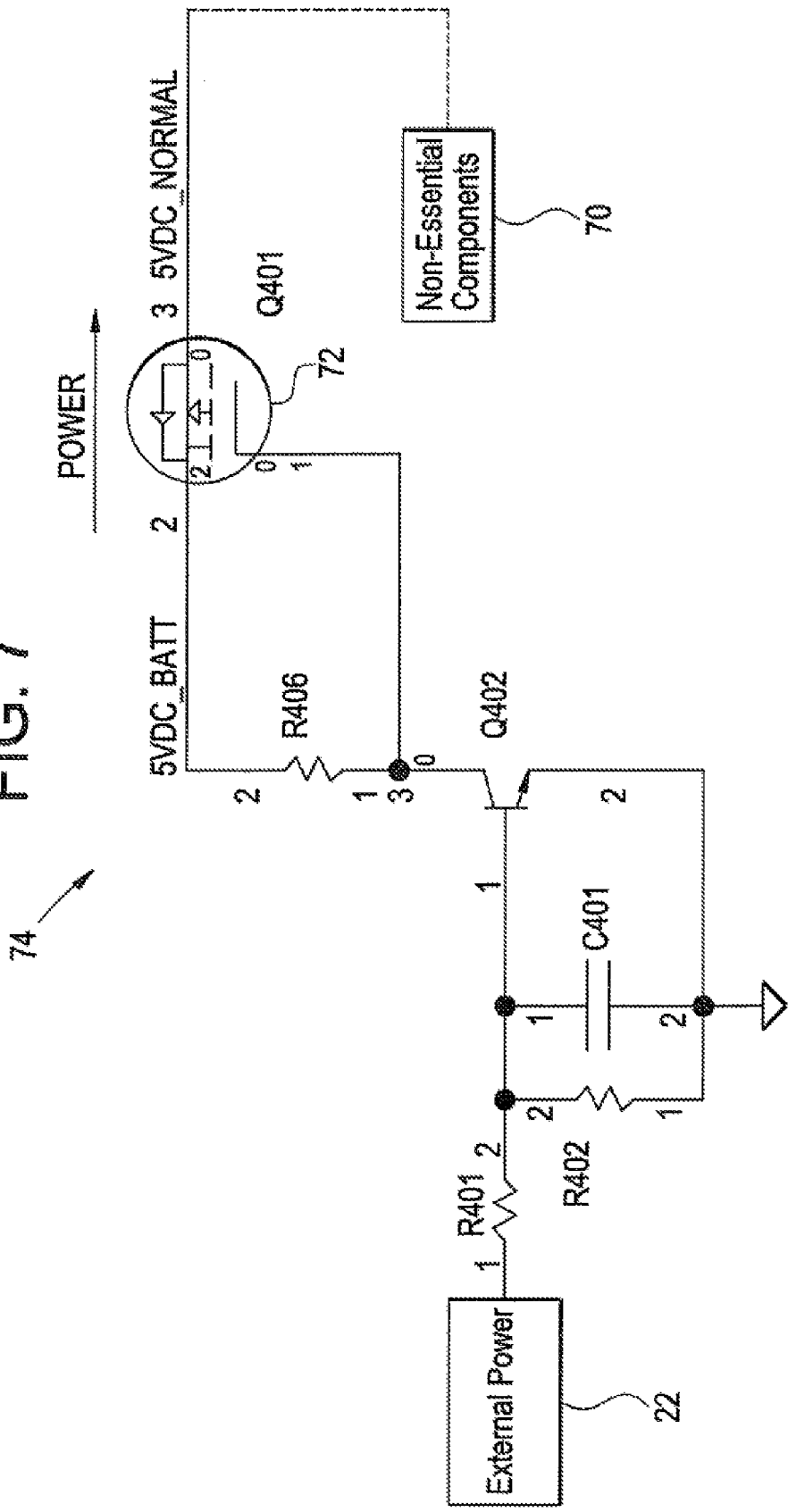

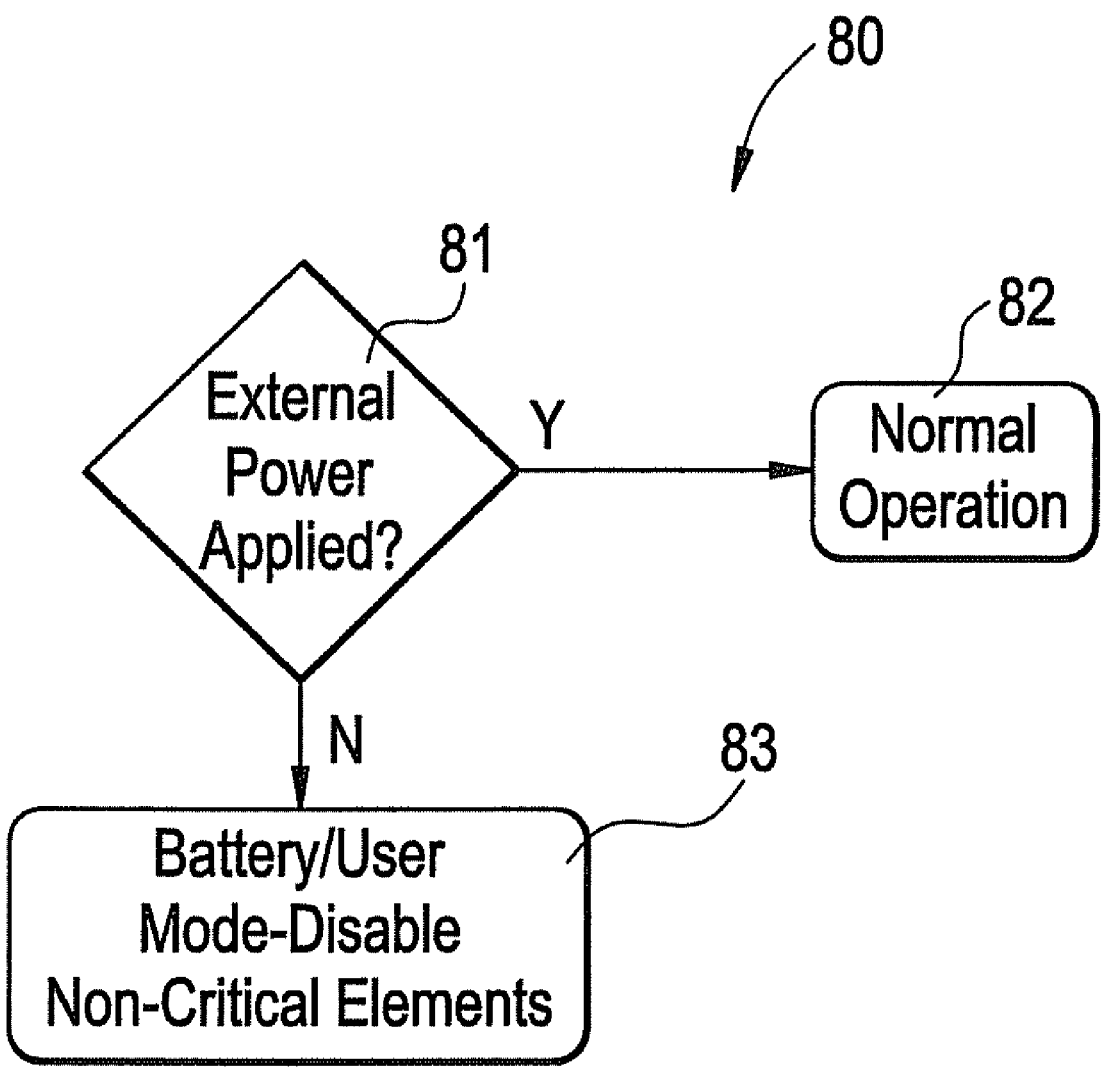

SYSTEM AND METHOD FOR MANAGING POWER SUPPLY TO A CIRCUIT BREAKER CONTROL UNIT

BACKGROUND OF THE INVENTION

The subject matter disclosed herein relates to electrical distribution equipment and, more particularly, to circuit breaker power controls.

Conventional electrical distribution equipment generally includes one or more circuit breakers, and often includes a plurality of circuit breakers housed in drawout units in switchgear housings and other electrical equipment. Such circuit breakers include trip unit devices that provide protection for cables, motors and other loads by measuring electrical current and simulating the heating of said cables, motors and loads. In most cases the trip unit has a front LCD display and keypad and/or buttons. The trip unit uses the LCD screen and keypad buttons to set multiple parameters. Some examples of such parameters are: view protection levels, time of trip delays, and enabling and disabling trips such as ground fault. Older trip units require a battery button on the keypad to enable the processor to turn on the LCD display when there is no external power on the trip unit.

There are several disadvantages associated with the conventional circuit breaker trip units. One disadvantage is that such trip unit keypads require a separate battery button to connect the battery to the keypad to power the keypad when external power sources are not available. This feature introduces the risk of excess or unnecessary power consumption by the keypad and/or other components of the trip unit controller, which in turn negatively affects battery life.

BRIEF DESCRIPTION OF THE INVENTION

A system for controlling power in a circuit breaker trip unit, constructed in accordance with exemplary embodiments of the invention includes: a user interface operably coupled to the trip unit and having a plurality of input keys; a power conditioner operably coupled to the user interface and operably coupled to a battery power source and an external power source; and a power control circuit. The power control circuit is configured to automatically electrically connect the battery power source to the power conditioner in response to activation of any of the plurality of input keys, and in the absence of an electrical connection between the external power source and the power conditioner.

Other exemplary embodiments of the invention include a method of controlling power in a circuit breaker trip unit. The method includes: activating any one of a plurality of input keys of a user interface that is operably coupled to the trip unit, the trip unit including a power conditioner operably coupled to the user interface and operably coupled to a battery power source and an external power source; and automatically electrically connecting the battery power source to the power conditioner in response to the activation of any of the plurality of input keys, and in the absence of an electrical connection between the external power source and the power conditioner.

Further exemplary embodiments of the invention include a system for controlling power in a circuit breaker trip unit. The system includes: a power conditioner operably coupled to a battery power source and an external power source, and operably coupled to a plurality of components of the trip unit, the plurality of components including a first group of components and a second group of components; and a switch operably coupled to the external power source and to the second group of components, the switch configured to close in response to an electrical connection between the external power source and the power conditioner to electrically connect the second group of components to the power supply.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

BRIEF DESCRIPTION OF THE DRAWINGS

FIG. 7 is a diagram of another exemplary embodiment of a system for controlling power distribution of FIG. 6; and FIG. 8 is a flow chart providing another exemplary method for controlling power distribution of FIG. 6.

DETAILED DESCRIPTION OF THE INVENTION

There is provided a system and method for managing power consumption in a circuit breaker trip unit. A device is provided to control power and operation of the trip unit and an associated keypad. In one embodiment, the device is configured to provide power to the keypad upon activation of any key or button on the keypad. In another embodiment, the device provides power to the keypad from a battery, and detects whether an external power source is available. If an external power source is available, the device electrically disconnects the battery and allows the keypad, trip unit controller and/or other circuit breaker or trip unit components to be powered by the external power source. As used herein, "external power source" refers to any non-battery power source. In another embodiment, the device is configured to provide power only to selected sections of the trip unit in the absence of external power (for example, microprocessor, LCD or other screen of the keypad) to reduce power consumption.

Figure 1:
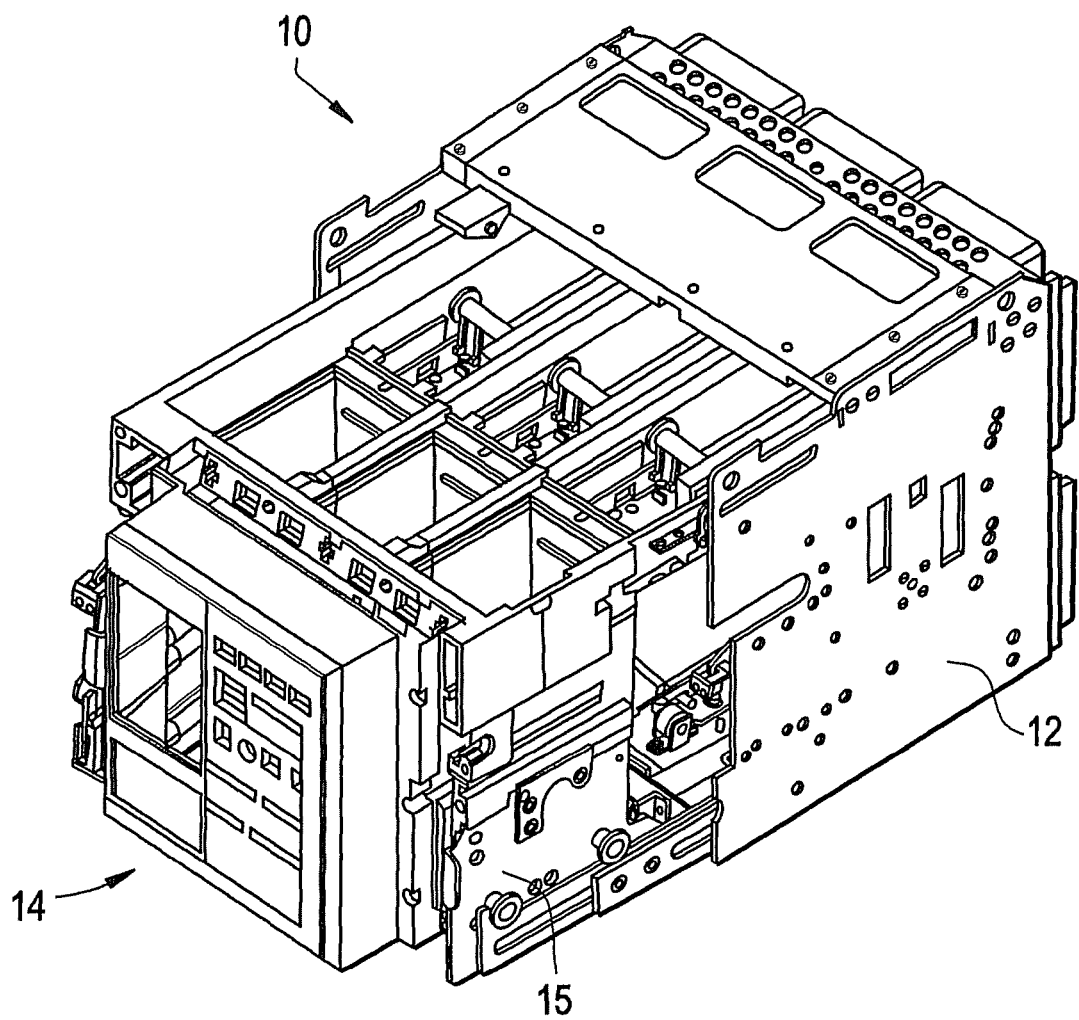
FIG. 1 is a right perspective view of an electrical distribution device assembly illustrating a circuit breaker in accordance with an exemplary embodiment of the invention.

With initial reference to FIG. 1, an electrical distribution device assembly constructed in accordance with an exemplary embodiment of the invention is indicated generally at 10. Electrical distribution device assembly 10 includes a housing or drawout substructure 12. Electrical distribution device assembly 10 further includes an electrical distribution device, shown in the form of a circuit breaker 14, positioned in the drawout substructure 12. In one embodiment, the circuit breaker 14 is housed in a cassette 15.

Figure 2:
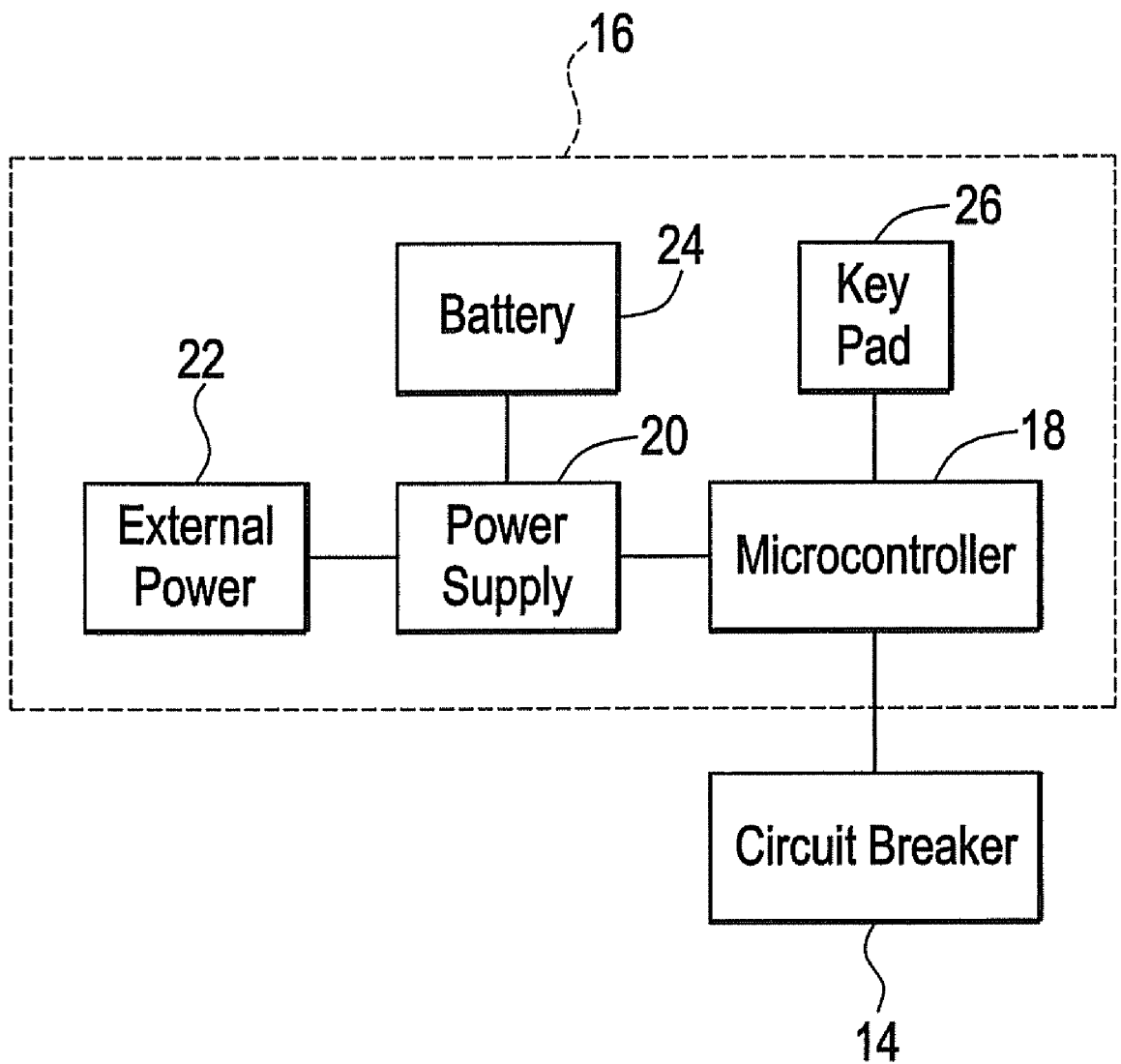
FIG. 2 is a diagram of a trip unit coupled to the circuit breaker of FIG. 1.

Referring to FIG. 2, the circuit breaker 14 is operably coupled to a trip unit 16 which includes and is controlled by a control unit, such as a microcontroller 18 or other processor. The control unit 18 is connected to a power supply 20, which is in turn connected to an external power source 22 and a battery 24. The external power supply 22 is considered any power supply separate from the battery 24. In one embodiment, the external power is supplied via a power circuit connected to the microcontroller 18 that controls the trip unit 16. The control unit 18 is also connected to a keypad 26.

Figure 3:
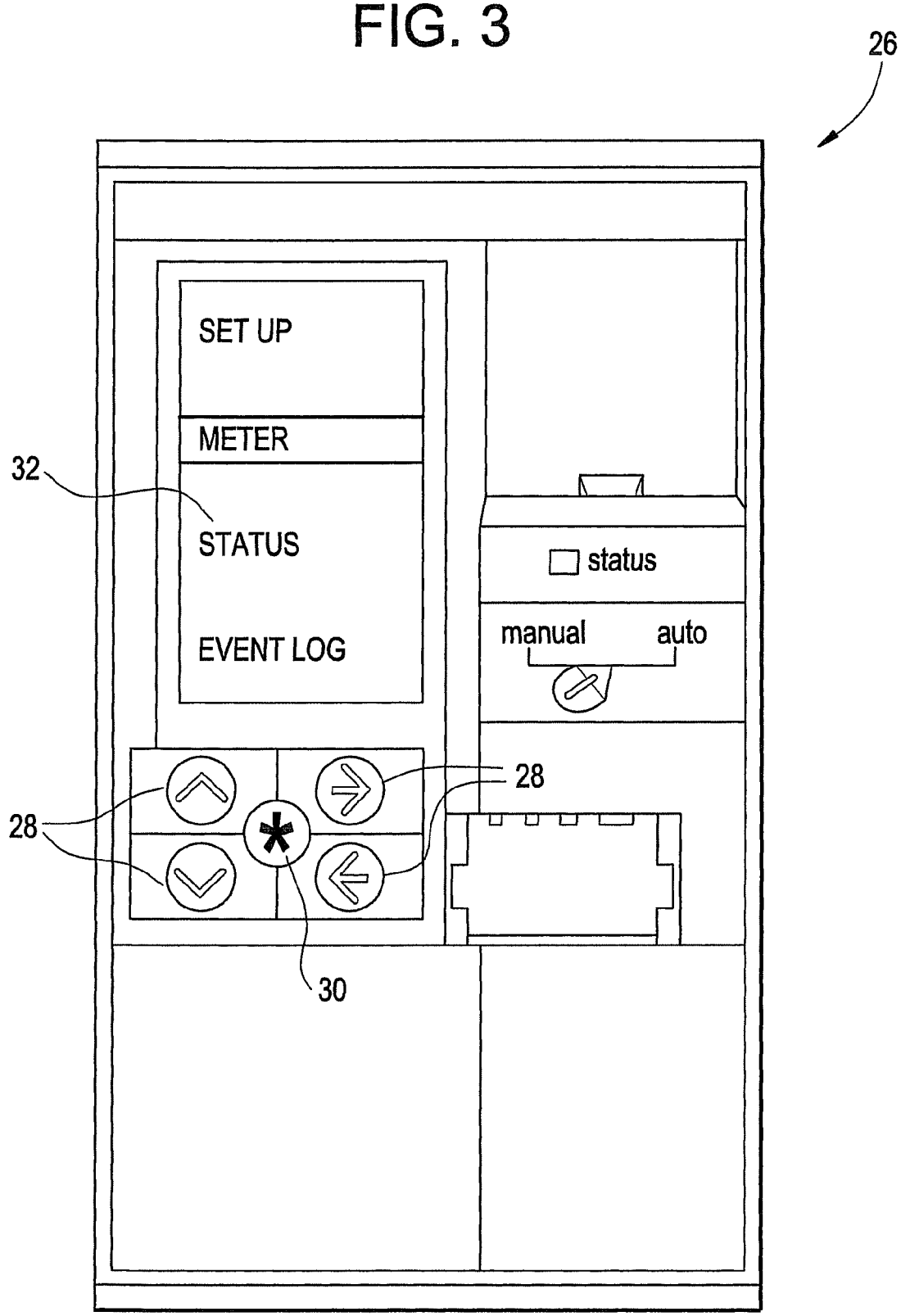
FIG. 3 is a front view of a keypad of the trip unit of FIG. 2.

Referring to FIG. 3, the keypad 26 allows a user to set various parameters for the trip unit 16. The keypad 26 allows users to, for example, view and modify protection levels, modify the time of trip delays, and enable or disable different types of trips, for example, ground faults. The keypad includes buttons 28, and in one embodiment, a save button 30. The keypad 26 also includes a display screen 32. In one embodiment, the display screen 32 is an LCD display, although any suitable display type may be used.

Figure 4:
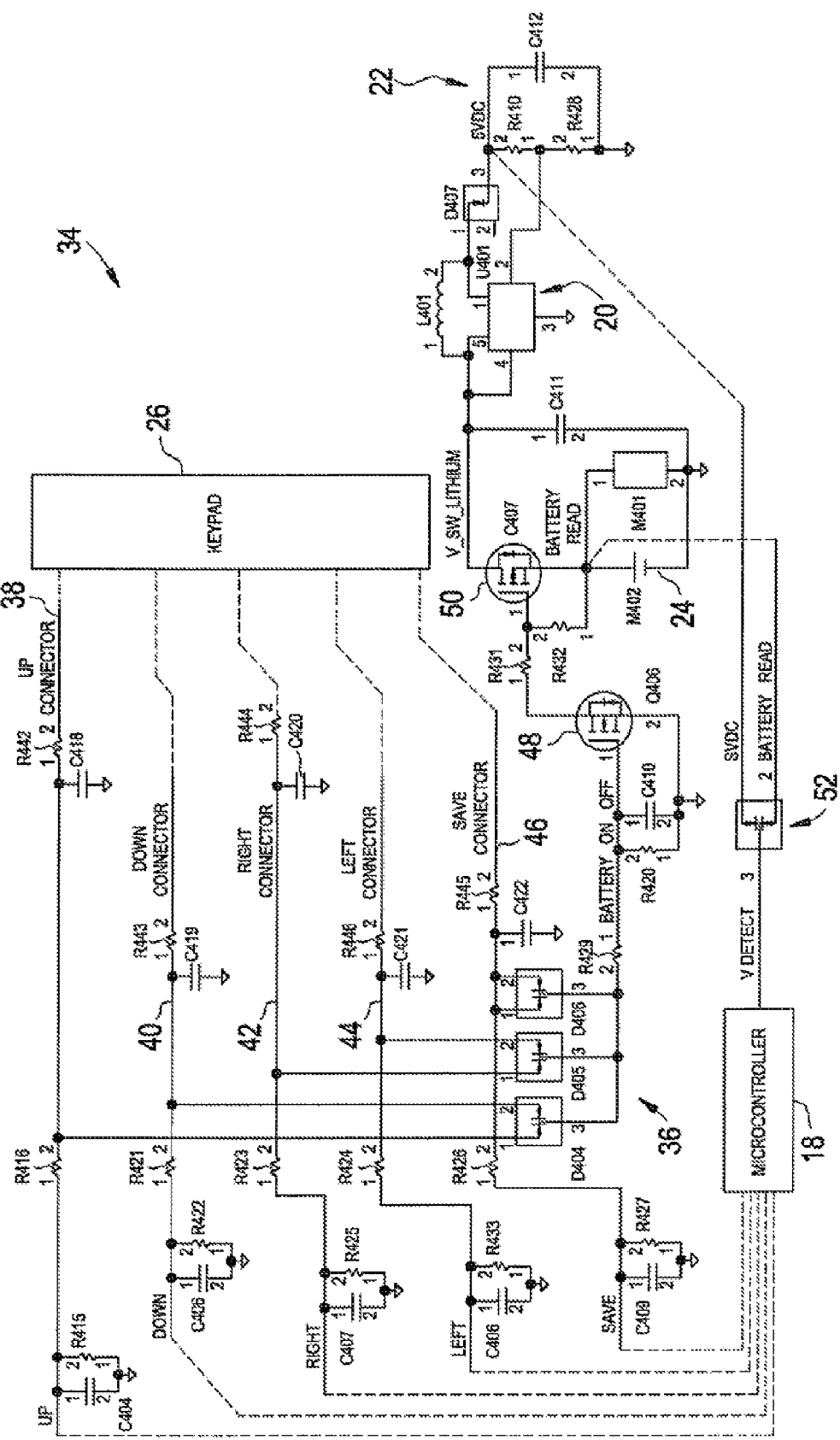
FIG. 4 is a diagram of an exemplary embodiment of a system for controlling a trip unit and keypad of the circuit breaker of FIG. 1.

Referring to FIG. 4, a trip unit control system 34 is shown for controlling power sources to the microcontroller 18, the keypad 26 and/or other components of the circuit breaker 14 or trip unit 16. The system 34 includes a control circuit 36 connected to the keypad 26, the microcontroller 18, the battery 24, the power supply 20, and the external power source 22.

In an exemplary embodiment, the control circuit 36 includes a plurality of connectors, each coupled to a respective button 28, 30 on the keypad 26 for transmitting signals from the buttons 28, 30 to the microcontroller 18. In an exemplary embodiment, the connectors include an "up" connector 38, a "down" connector 40, a "right" connector 42, a "left" connector 44, and a "save" connector 46.

In an exemplary embodiment, the control circuit 36 includes at least one switch 48 connected to the battery 24. In this embodiment, an additional switch 50 is connected between the switch 48 and the battery 24. The number of switches is exemplary and may be modified as desired.

Each switch 48 and 50 may be any type of switch, including any of various transistors such as a field-effect transistor (FET). For example, switch 48, which is also designated "Q406", is an ultra low level FET, and switch 50, which is also designated "Q407", is a P-channel extremely low level FET.

In an exemplary embodiment, a power signal diode 52 is connected to the external power source 22 and the battery 24, which provide input power signals, and is also connected to the microcontroller 18 and provides an output signal thereto based on the input signals. In an exemplary embodiment, the input signals from the battery 24 and the external power source 22 are referred to as "BATTERY_READ" and "5 VDC", respectively, and the output signal is referred to as V_DETECT. In another exemplary embodiment, the power signal diode 52 is configured as an "OR" logic gate.

The power supply 20, also referred to as the power conditioner, receives power from the battery 24 and/or the external power source 22, and in turn supplies power to the keypad and/or the microcontroller 18. In an exemplary embodiment, the power supply 20 is any type of power conditioner or other device configured to modify a voltage or other characteristic of a signal from a power source to a desired level. In an exemplary embodiment, the power supply 20 includes a converter "U401" and an inductor "L401" for converting the voltage from the battery and/or external power source 22 to a voltage selected for the circuit 36. In one example, the converter U401 is a Micropower Step-up DC/DC Converter, which is capable up stepping up voltage supplied by the battery, for example 3 Volts, to a voltage sufficient for the circuit 36, for example, 5 Volts. Although in the exemplary embodiments described herein, the power supply 20 provides a voltage of 5 Volts, any suitable voltage may be provided.

Figure 5:
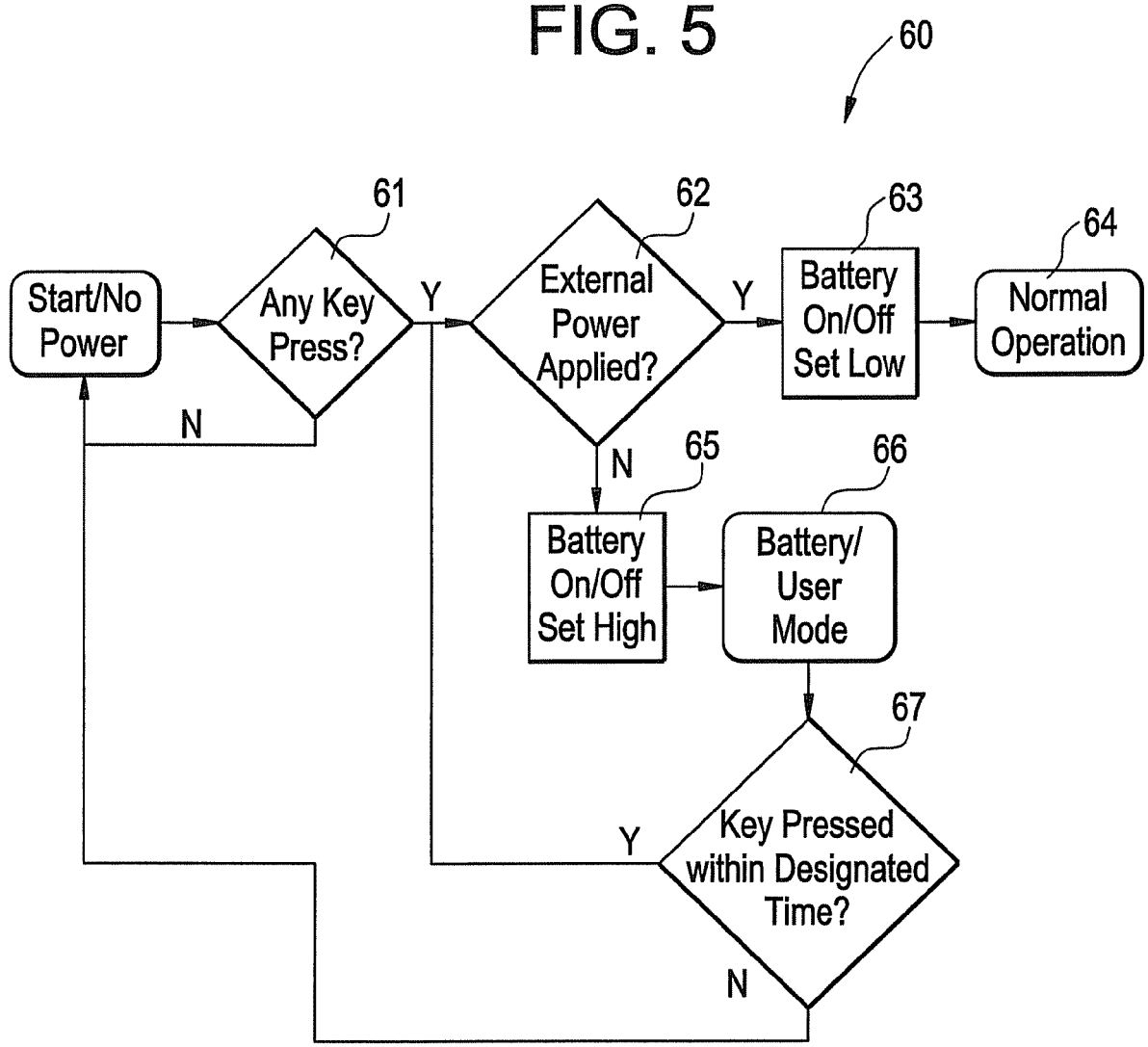
FIG. 5 is a flow chart providing an exemplary method for controlling power to a trip unit and/or control unit of the circuit breaker of FIG. 4.

FIG. 5 illustrates an exemplary method 60 for controlling power to a keypad and/or control unit of a circuit breaker trip unit. The method 60 includes one or more stages 61-67. In an exemplary embodiment, the method includes the execution of all of stages 61-67 in the order described. However, certain stages may be omitted, stages may be added, or the order of the stages changed. In the exemplary embodiment described herein, the method is described in conjunction with the keypad 26 and the microcontroller 18. However, the method 60 may be performed in conjunction with any type of trip unit controller and any type of keypad or other device for setting trip unit parameters and displaying setting information.

In the first stage 61, the microcontroller 18 detects the pressing of a button 28, 30 on the keypad 26. In the absence of any button 28, 30 being pressed or actuated, no power is applied to the microcontroller 18 or the keypad 26. In an exemplary embodiment, the pressing of a button (for example, up, down, left right buttons 28 and save button 30) causes a signal to be sent to the microcontroller 18 via a respective connector 38, 40, 42, 44 or 46.

In the second stage 62, the microcontroller 18 determines whether the external power source 22 is connected to the power supply 20. In an exemplary embodiment, the microcontroller identifies that the external power source 22 is connected to and provides power to the power supply 20 if it receives a signal, referred to as the "5 VDC" signal, from the external power source 22. In an exemplary embodiment, the 5 VDC signal from the external power source 22 is input into the power signal diode 52, which in turn outputs the V_DETECT signal that corresponds to the external power source 22. In another exemplary embodiment, the microcontroller 18 recognizes that the V_DETECT signal corresponds to the external power source 22 by recognizing a voltage level corresponding to the external power source 22.

In the third stage 63, if a signal is received from the external power source 22, the microcontroller draws power from the external power source 22 and does not connect the battery 24 to the circuit 36. For example, the microcontroller 18 supplies a signal, referred to as a "BATTERY_ON_OFF" signal, to switch 48, which is set to "low", that is, has a voltage lower than the threshold voltage of the switch 48 or is otherwise insufficient to close the switch 48. In this way, the battery 24 remains disconnected from the power supply 20 and is not being used to power the microcontroller 18 or the keypad 26.

In the fourth stage 64, the microcontroller 18 and the keypad 26 operate in a normal operation mode, i.e., utilizing power exclusively from the external power source 22.

In the fifth stage 65, if a 5 VDC signal is not received from the external power source 22, the microcontroller 18 supplies a "high" BATTERY_ON_OFF signal to switch 48, that is, a signal that creates a voltage across the switch 48 sufficient to cause the switch 48 to close. Closure of the switch 48 in turn causes the battery 24 to be connected to the power supply 20 and provide power to the power supply 20. In an exemplary embodiment, closure of the switch 48 also causes closure of the switch 50 to connect the battery 24.

In an exemplary embodiment, the fifth stage 65 is performed directly in response to a button 28, 30 being pressed. In this exemplary embodiment, pressing a button 28, 30 causes a voltage across the switch 48 sufficient to close the switch 48 and connect the battery 24 to the power supply 20. Thus, the fifth stage 66 is performed in this exemplary embodiment prior to determining whether the external power source 22 is connected to the power supply 20. The power supply 20 in turn provides power to the microcontroller 18.

In the sixth stage 66, the microcontroller 18 and the keypad 26 operate in a battery/user mode, i.e., utilizing power exclusively from the battery 24.

In the seventh stage 67, if a selected period of time has elapsed after the pressing of any button 28, 30, the BATTERY_ON_OFF signal is set to low and the microcontroller 18 opens the switch 48 to disconnect the battery 24 from the power supply 20, thus turning off the system. The selected period of time may be any selected period, for example, 10 seconds, desired by a user.

Figure 6:
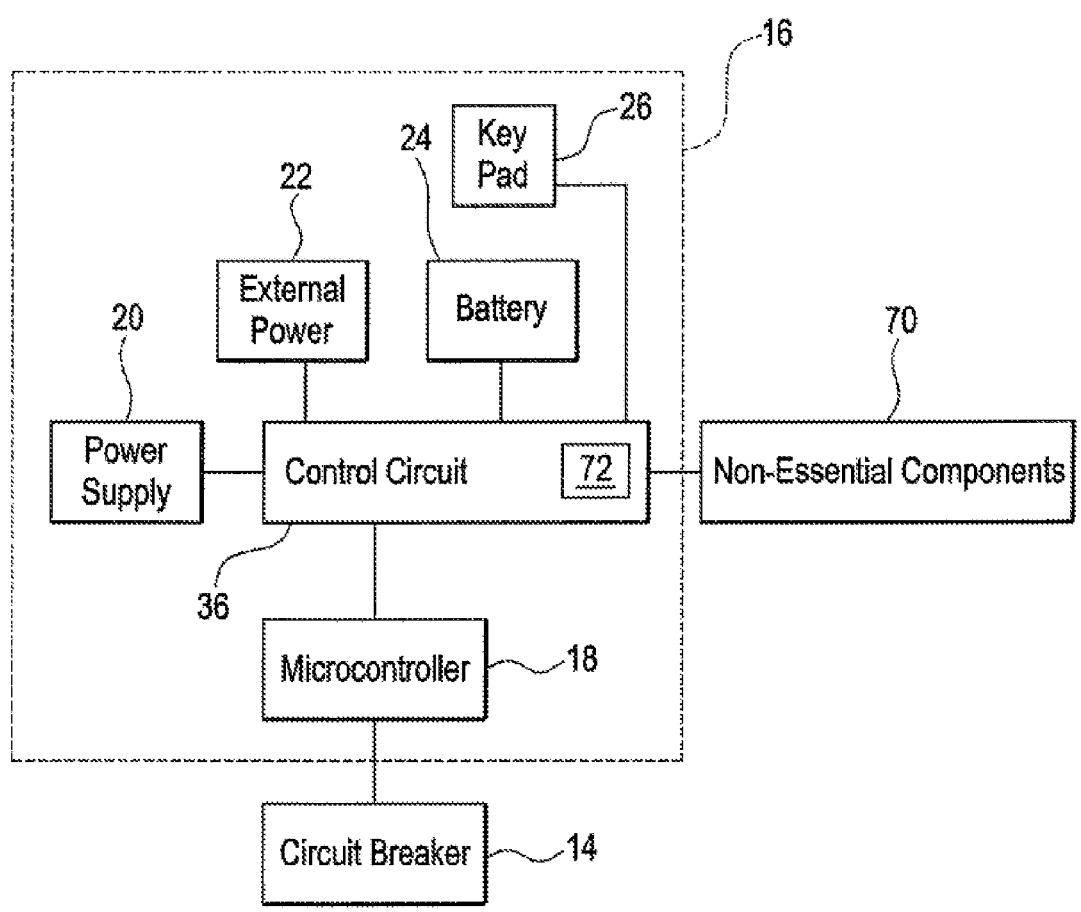
FIG. 6 is a diagram of another exemplary embodiment of the trip unit coupled to the circuit breaker of FIG. 1.

Referring to FIG. 6, the circuit breaker 14 is operably coupled to the trip unit 16 which includes and is controlled by the microcontroller 18. The control circuit 36 is connected to the keypad 26 and the power supply 20, and is also connected to the battery 24 and the external power source 22. Non-essential components 70 are coupled to the control circuit 36. Such non-essential components 70 include any components deemed unnecessary to effect, for example, changing trip unit parameters via the keypad 26 or other selected functions, and can thus be excluded from battery power during execution of the selected functions to preserve battery power. A power switch 72 electrically connects the non-essential components to the power supply 20 and is also connected to the external power source 22. In operation, if the external power source 22 is electrically connected and providing power to the power supply 20, the external power source 22 will also apply a voltage across the power switch 72 to close the power switch 72 and provide power, referred to herein as "5 VDC_NORMAL", to the non-essential components 70. When the external power source 22 is disconnected from the power supply 20, the power switch 72 remains open so that only essential components are connected to the power supply when only battery power, referred to as "5 VDC_BATT", is available.

Referring to FIG. 7, a power circuit 74 providing an exemplary implementation of the power switch 72 is provided. The power circuit 74 allows for connection between the power supply 20 and the external power source 22. The power circuit 74 includes the switch 72 for providing power to the power supply from the external power source 22.

In an exemplary embodiment, the switch 72, which is also designated "Q401", may be any type of switch, including any of various transistors such as a FET.

FIG. 8 illustrates an exemplary method 80 for controlling power to a keypad and/or control unit of a circuit breaker trip unit. The method 80 includes one or more stages 81-83. In an exemplary embodiment, the method includes the execution of all of stages 81-83 in the order described. However, certain stages may be omitted, stages may be added, or the order of the stages changed. In the exemplary embodiment described herein, the method is described in conjunction with the keypad 26 and the microcontroller 18. However, the method 80 may be performed in conjunction with any type of trip unit controller and any type of keypad or other device for setting trip unit parameters and displaying setting information.

In the first stage 81, it is determined whether the external power 22 is applied to the power supply 20. If the external power 22 is not applied, the voltage signal 5 VDC_BATT from the battery 24 is only connected to the microcontroller 18, the keypad 26 and/or other components deemed essential for operation. Such essential components include any components deemed necessary to effect, for example, changing trip unit parameters via the keypad 26 or other desired functions without providing power to all components of the trip unit.

In the second stage 82, if the external power 22 is applied, the switch 72 is closed, and the voltage signal from the external power source 22, in the form of signal 5 VDC_NORMAL, is applied to all components connected to the control circuit 36, including the non-essential components.

In the third stage 83, if the external power 22 is not applied, the switch 72 remains open, and the non-essential components are disconnected from the power supply 20. If the battery 24 is connected to the power supply 20, a voltage signal 5 VDC_BATT is applied only to the essential components such as the microcontroller 18 and the keypad 26.

In the exemplary embodiments described herein, 5 Volt DC signals such as the 5 VDC_NORMAL and 5 VDC_BATT are described. The voltage levels described herein are not limited to those levels described in the exemplary embodiments. Any desired voltage levels may be utilized with the systems described herein.

The control circuit 36 and/or power control circuit 70 may include any number and type of components. Examples are shown in FIGS. 1 and 3, and include various resistors, capacitors, transistors, diodes, inductors and others. Such examples include resistors R401, R402, R406, R410, R415, R416, R421-R433 and R442-R446. Examples also include capacitors C401, C404, C406-C412, C419 and C421, diodes D403-407, inductor L401, converter U401, and transistors Q401, Q402, Q406 and Q407. The configuration of the control circuit is merely exemplary, as any suitable configuration may be used to control connection to the battery.

The system and method described herein provide numerous advantages over prior art systems. Prior art systems generally included a separate "battery" button to energize the battery in the absence of external power. The systems and methods described herein eliminate the need for such a control, as use of the battery is automatically initiated by pushing any button on the keypad. In addition, the systems and methods described herein reduce power consumption relative to prior art systems.

The systems and methods reduce power consumption by the battery and thereby increase battery life. In one embodiment, the system checks to determine whether external power is available, and if so, automatically switches power from the battery to the external power. In another embodiment, the system provides for power to only selected "essential" components needed for a desired function in the absence of external power, which also preserves battery power and life. Prior art trip units generally enable all hardware functions when the keypad is activated, causing massive amounts of power consumption and reduced life capability.

The capabilities of the embodiments disclosed herein can be implemented in software, firmware, hardware or some combination thereof. As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the disclosed embodiments can be provided.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the invention if they have structural elements that do not differ from the literal language of the claims, or if they include equivalent structural elements with insubstantial differences from the literal language of the claims.

The invention claimed is:

1. A system for controlling power in a circuit breaker trip unit, the system comprising:
   a user interface operably coupled to the trip unit and having a plurality of input keys;
   a power conditioner operably coupled to the user interface and operably coupled to a battery power source and an external power source; and
   a control circuit, the control circuit configured to, in response to an activation of any one of the plurality of input keys, determine whether there is an electrical connection between the external power source and the power conditioner and electrically connect the battery power source to the power conditioner in response to an absence of the electrical connection.

2. The system of claim 1, wherein the power conditioner is operably coupled to at least one of the user interface and control unit.

3. The system of claim 1, wherein the control circuit includes a switch operably coupled between the power conditioner and the user interface, the switch configured to close in response to a signal generated by the activation of any of the plurality of input keys, to electrically connect the power conditioner to the battery power source.

4. The system of claim 3, wherein the switch is a transistor.

5. The system of claim 4, wherein the signal has a voltage greater than a threshold voltage of the switch.

6. The system of claim 1, further comprising a control unit operably coupled to the power control circuit, the control unit configured for detecting an electrical connection between the external power source and the power conditioner, and in response to detection of the external power source, electrically disconnecting the battery power source from the power conditioner.

7. The system of claim 6, wherein the power control circuit includes a switch operably coupled between the power conditioner and the trip unit control processor, the control unit configured to control operation of the switch.

8. The system of claim 7, wherein the switch is a transistor.

9. The system of claim 8, wherein the control unit is configured to control operation of the switch by at least one of: transmitting an on signal having a first voltage higher than a threshold voltage of the switch, and transmitting an off signal having a second voltage lower than the threshold voltage.

10. The system of claim 1, further comprising a control unit operably coupled to the power control circuit, the control unit for electrically disconnecting the battery power source from the power conditioner upon expiration of a selected period of time during which none of the plurality of keys has been activated.

11. A method for controlling power in a circuit breaker trip unit, the method comprising:
   activating any one of a plurality of input keys of a user interface that is operably coupled to the trip unit, the trip unit including a power conditioner operably coupled to the user interface and operably coupled to a battery power source and an external power source; and
   electrically connecting the battery power source to the power conditioner in response to the activation of any of the plurality of input keys, and in response to the absence of an electrical connection between the external power source and the power conditioner.

12. The method of claim 11, wherein electrically connecting includes generating a signal from the activation of any of the plurality of keys, and in response to the signal, closing a switch operably coupled between the power conditioner and the user interface to electrically connect the power conditioner to the battery power source.

13. The method of claim 11, further comprising detecting an electrical connection between the external power source and the power conditioner, and in response to detection of the external power source, electrically disconnecting the battery power source from the power conditioner.

14. The method of claim 11, wherein the power control circuit includes a switch operably coupled between the power conditioner and the user interface, electrically connecting includes transmitting an on signal having a first voltage higher than a threshold voltage of the switch, and electrically disconnecting includes transmitting an off signal having a second voltage lower than the threshold voltage.

15. The method of claim 11, further comprising electrically disconnecting the battery power source from the power conditioner upon expiration of a selected period of time during which none of the plurality of keys has been activated.

16. A system for controlling power in a circuit breaker trip unit, the system comprising:
   a user interface operably coupled to the trip unit and having a plurality of input keys;
   a power conditioner operably coupled to a battery power source and an external power source, and operably coupled to a plurality of components of the trip unit, the plurality of components including a first group of components and a second group of components; and
   a switch operably coupled to the external power source and to the second group of components, the switch configured to close in response to activation of any of the plurality of input keys and in response to an electrical connection between the external power source and the power conditioner to electrically connect the second group of components to the power conditioner.

17. The system of claim 16, wherein the switch is a transistor, and the switch is configured to close in response to a signal from the external power source having a voltage greater than a threshold voltage of the switch.

18. The system of claim 16, wherein the first group of components includes one or more components essential for performance of a selected function of the trip unit, and the second group of components includes one or more components not essential for performance of the selected function.

19. The system of claim 18, wherein the first group of components includes a user interface and a trip unit control processor.

* * * * *